UNITED STATES PATENT OFFICE.

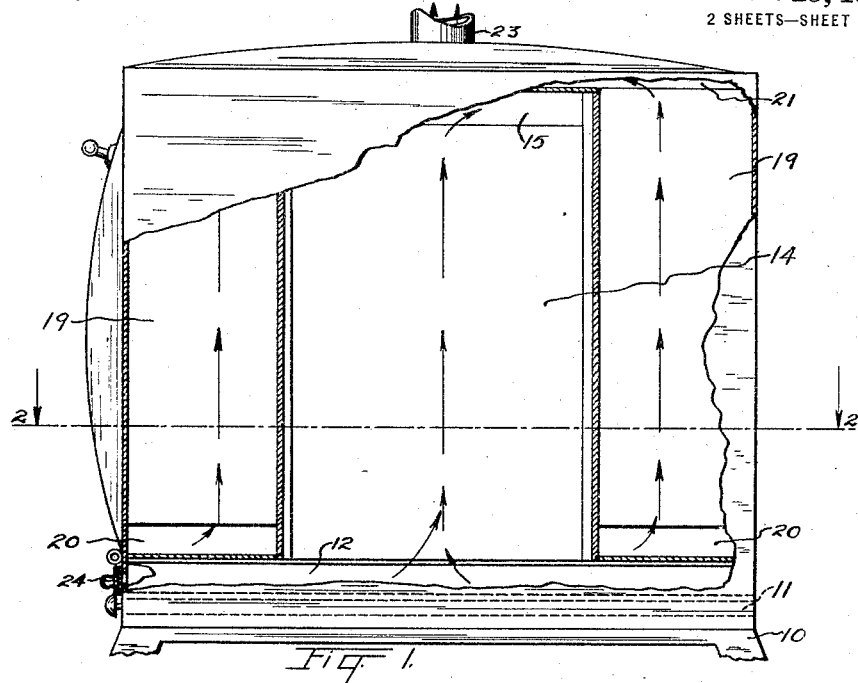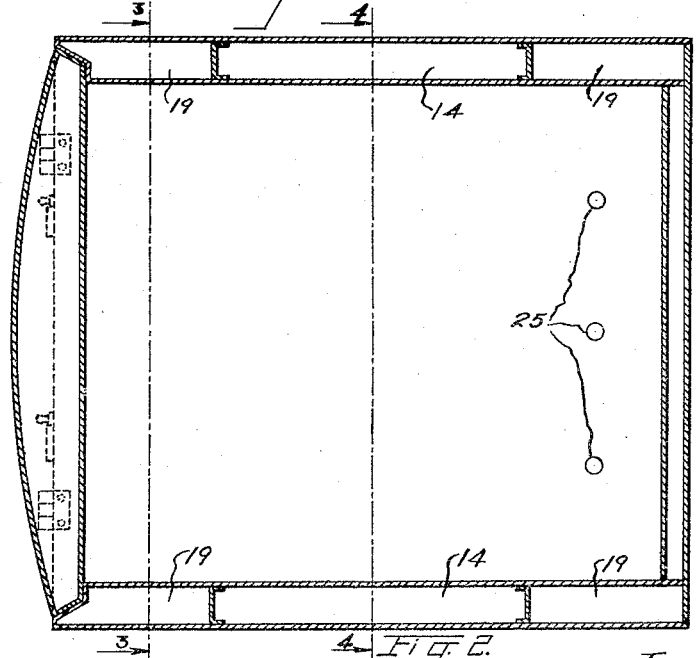

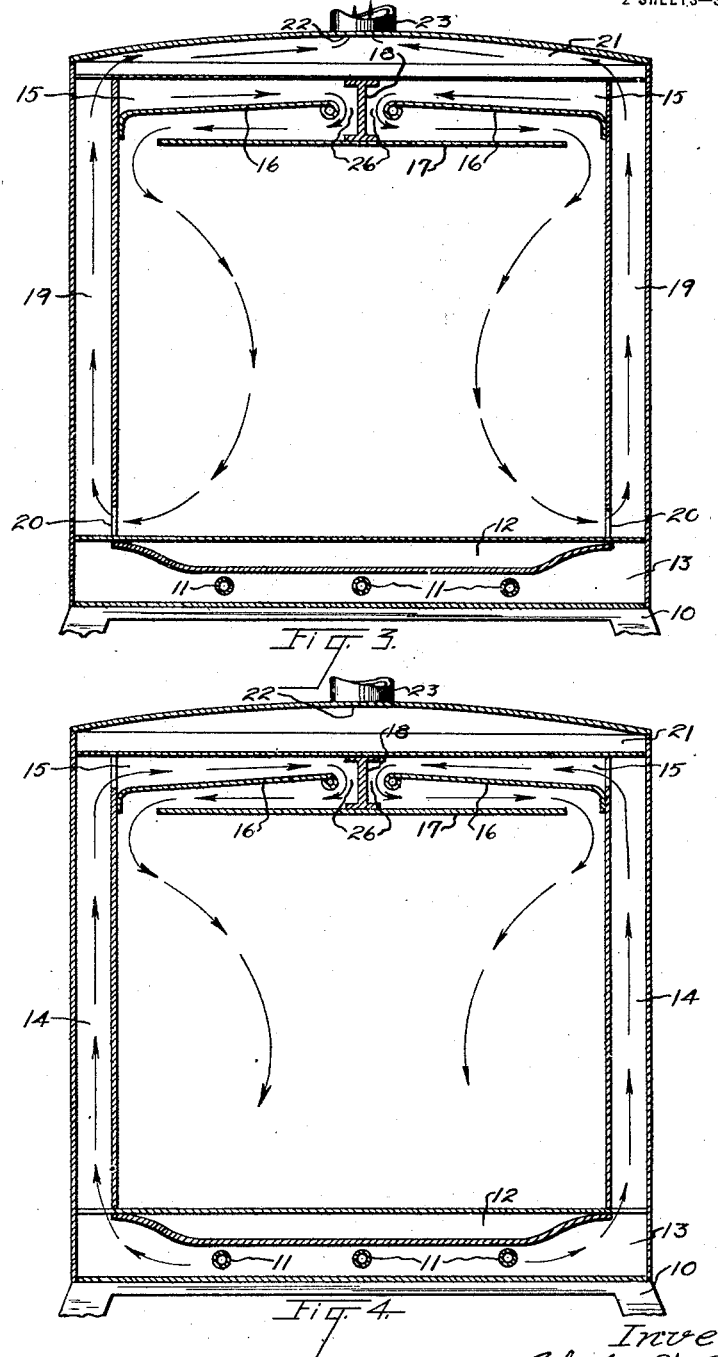

CHARLES W. ZWEILY, OF WILLOW SPRINGS, ILLINOIS.

BAKING-OVEN.

1,366,686.  Specification of Letters Patent.  Patented Jan. 25, 1921.

Application filed January 31, 1919. Serial No. 274,198.

*To all whom it may concern:*

Be it known that I, CHARLES W. ZWEILY, a citizen of the United States, residing at Willow Springs, in the county of Cook, State of Illinois, have invented certain new and useful Improvements in Baking-Ovens, of which the following is a specification.

The object of my invention is to realize a more equal all-around heating of the objects placed into the oven for baking; to provide for a continuous circulation of the heated air around such objects; and to retard the passing off of the heated air while making use of it for heating purposes.

In the drawings, Figure 1 is a side elevation of my oven, with parts broken away; Fig. 2 is a horizontal section of my oven, viewed from above, in the plane indicated by line 2—2 in Fig. 1; and Figs. 3 and 4 are vertical sections of my oven in the planes indicated by lines 3—3 and 4—4, respectively, in Fig. 2.

Referring to the drawings, on base 10 there is provided a suitable source of heat-supply, such as gasburners 11. These are preferably located close to double bottom 12 of my oven, and are inclosed in a chamber 13 preferably formed so as to prevent the escape of heat generated by gasburners 11 except along the side-edges of bottom 12, which, to facilitate such escape, is made of less thickness there, with a taper toward flues 14 which constitute the middle portion of the side walls of my oven, and which are adapted to convey the heated air and gases entering them from below into chambers 15, formed immediately below the double top of my oven by plates 16. From spaces 15 openings 26 are provided, preferably near the middle of my oven, into the interior of my oven; but heated air and gases entering through these openings are prevented from passing directly downward by baffle-plate 17 which is preferably suspended, by means of a vertical partition 18, from the top of my oven and serves to deflect the course of air and gas entering through openings 16 toward the sides, rear and front of my oven, where they may flow downward over the edges of plate 17. As the heated air and gases thus entering my oven are gradually cooling, they sink down and are drawn off by flues 19 which constitute the front and rear portions of the side walls of my oven, and which are provided with openings 20 at their lower ends and lead with their open upper ends into the interior 21 of the double top of my oven. From space 21 the used air and gas finally are drawn off, through opening 22, preferably into chimney pipe 23. Double bottom 12 of my oven is provided with inlets 24, controlled by suitable shutters, and outlets 25, for the circulation of air through such bottom if such circulation is desired. Flues 14 and 19 may be provided in other upright walls of my oven as well as in the side walls, and it is evident that the construction of my oven may be otherwise changed in numerous particulars without deviating from the principal features of my invention. All such changes I intend to cover.

I claim:—

1. In a baking oven provided with a double top and bottom, the combination of a heating chamber under the double bottom; means for generating heat in said chamber; upper chambers below the double top of the oven having openings into the interior of the oven near the middle thereof; flues forming the side walls of the oven, part of such flues leading from said heating chamber to said upper chambers, and another part of such flues leading from the interior of the oven, near its bottom, to the interior of the double top of the oven; a baffle-plate extending below the openings leading from the upper chambers into the interior of the oven; an outlet from the interior of the double top of the oven; shutter-controlled air inlets to the interior of the double bottom of the oven; and outlets from the interior of the double bottom into the interior of the oven.

2. In a baking oven provided with a double top and bottom, the combination of a heating chamber under the double bottom; means for generating heat in said chamber; upper chambers below the double top of the oven having openings into the interior of the oven near the middle thereof; flues forming the side walls of the oven; part of such flues leading from said heating chamber to said upper chambers and another part of such flues leading from the interior of the oven, near its bottom, to the interior of the double top of the oven; shutter-controlled air inlets to the interior of the double bottom of the oven; and outlets from the interior of the double bottom to the interior of the oven.

3. In a baking oven provided with a double top and bottom, the combination of a heating chamber under the double bottom; means for generating heat in said chamber; upper chambers below the double top of the oven having openings into the interior of the oven; flues forming upright walls of the oven, part of such flues leading from said heating chamber into said upper chambers and another part of such flues leading from the interior of the oven, near the bottom, to the interior of the double top of the oven; and an outlet from the interior of the double top of the oven.

CHARLES W. ZWEILY.